(12) United States Patent
Ditu et al.

(10) Patent No.: US 9,098,298 B2
(45) Date of Patent: Aug. 4, 2015

(54) OPTIMIZATION METHOD FOR COMPILER, OPTIMIZER FOR A COMPILER AND STORAGE MEDIUM STORING OPTIMIZING CODE

(75) Inventors: Bogdan F. Ditu, Ploiest (RO); Dragos Badea, Bucharest (RO)

(73) Assignee: Freescale Semiconductor, Inc., Austin, TX (US)

( * ) Notice: Subject to any disclaimer, the term of this patent is extended or adjusted under 35 U.S.C. 154(b) by 164 days.

(21) Appl. No.: 13/816,595

(22) PCT Filed: Aug. 26, 2010

(86) PCT No.: PCT/IB2010/053851
§ 371 (c)(1),
(2), (4) Date: Feb. 12, 2013

(87) PCT Pub. No.: WO2012/025792
PCT Pub. Date: Mar. 1, 2012

(65) Prior Publication Data
US 2013/0139135 A1    May 30, 2013

(51) Int. Cl.
*G06F 9/45*    (2006.01)
(52) U.S. Cl.
CPC . *G06F 8/41* (2013.01); *G06F 8/441* (2013.01)
(58) Field of Classification Search
None
See application file for complete search history.

(56) References Cited

U.S. PATENT DOCUMENTS

| | | | | |
|---|---|---|---|---|
| 5,530,866 | A * | 6/1996 | Koblenz et al. | 717/144 |
| 8,434,074 | B2 * | 4/2013 | Janczak et al. | 717/140 |
| 8,713,547 | B2 * | 4/2014 | Gschwind et al. | 717/151 |
| 2003/0237080 | A1 * | 12/2003 | Thompson et al. | 717/161 |
| 2006/0225061 | A1 * | 10/2006 | Ludwig et al. | 717/161 |
| 2009/0007085 | A1 * | 1/2009 | Owen et al. | 717/146 |
| 2009/0064112 | A1 * | 3/2009 | Inagaki et al. | 717/140 |

OTHER PUBLICATIONS

Nickerson, B. R. "Graph Coloring Register Allocation for Processors with Multi-Register Operands", In: The ACM SPGPLAN 1990 conference on programming language design and implementation, New York: ACM, 1990, pp. 40-52 (Nickerson, B.).

Kong, T. et al, "Precise Register Allocation for Irregular Architectures", In: the 31st annual ACM/IEEE international symposium on Microarchitecture, Los Alamitos: IEEE Computer Society Press, pp. 297-307 (Kong, T. et al).

(Continued)

Primary Examiner — Isaac T Tecklu

(57) ABSTRACT

The invention pertains to an optimization method for a compiler, comprising providing a model of inter-operand constraints of physical registers of a target-platform of a compilation; and a) providing an intermediate representation of a source code using virtual registers; b) grouping the virtual registers of the intermediate representation based on the model of inter-operand constraints into two or more groups, each group comprising at least one virtual register; c) if for at least one group at least one interference of virtual registers within the group occurs, amending the intermediate representation to resolve at least one interference and jumping to step b); otherwise d) providing a representation of a group interference graph of interferences between the groups; and e) allocating virtual registers to physical registers using a coloring scheme on the representation of the group interference graph. The invention also refers to a corresponding optimizer for a compiler and a computer-readable storage medium storing optimizing code.

20 Claims, 3 Drawing Sheets

(56) References Cited

OTHER PUBLICATIONS

Runeson Johan et al: "Retargetable Graph-Coloring Register Allocation for Irregular Architectures", Computer and Chemical Engineering, 2003, pp. 1-15.

Hack Sebastian et al, "Towards Register Allocation for Programs in SSA-form", In: citeseerx.ist.psu.edu, 2005, pp. 1-32.

International Search Report and Written Opinion correlating to PCT/IB2010/053851 dated Apr. 28, 2011.

* cited by examiner

OPTIMIZATION METHOD FOR COMPILER, OPTIMIZER FOR A COMPILER AND STORAGE MEDIUM STORING OPTIMIZING CODE

FIELD OF THE INVENTION

This invention relates to an optimization method for a compiler, an optimizer for a compiler and a storage medium storing optimizing code.

BACKGROUND OF THE INVENTION

A compiler is a computer program for translating a source code written in a human-understandable programming language as e.g. C; C++, FORTRAN, etc. into machine-readable code. In most cases, a compiler provides a complete translation of a program in source code, which then may be run on a computer system. Different computer systems, in particular computer systems with different types of CPU (central processing unit), usually have different sets of machine-readable instructions and data structures. As an example, Intel x86-based computer systems at machine level tend to store values larger than 255 in a different bytewise order than e.g. IBM Power-based computer systems. Thus, for specific machines a compiler has to provide a specific machine-readable code. In addition, the operating system running on a computer system may influence the compiled code intended to run on a computer as well. A compiler easily reconfigurable to create a compiler for a new target-architecture respectively a compiler able to produce code for different computer systems respectively operating systems may be called retargetable. A retargetable compiler may be used to compile on one computer system a program which is supposed to run on a system with different architecture, which is called cross-compiling. A well-known retargetable compiler respectively compiler collection is the GCC (Gnu Compiler Collection) developed by the GNU project.

Modern compilers often provide optimization features, which may improve a program's performance significantly. Such optimizations can be performed on different levels and in different ways. One optimization approach deals with trying to optimize the use of registers during the runtime of a program. Registers may be provided independently of normal memory, e.g. random access memory (RAM), e.g. on-chip with a CPU or a memory management unit (MMU). Registers are usually much faster to access for reading or writing data than RAM, so that it is preferable to use registers for data transfer and manipulation as much as possible. However, the differences in registers of different architectures make it difficult to effectively adopt generalized optimization strategies for different target-platforms.

Examples for register allocation methods for compiler optimization are described in "Graph-Coloring Register Allocation for Processors with Multi-Register Operands" by Brian Nickerson in Proceedings of the ACM SIGPLAN'90 Conference on Programming Language Design and Implementation, White Plains, N.Y., Jun. 20-22, 1990 and in "Precise Register Allocation for Irregular Architectures" by Timothy Kong and Kent D. Wllken, presented at the $31^{st}$ International Microarchitecture Conference, December 1998.

SUMMARY OF THE INVENTION

The present invention provides an optimization method for a compiler, an optimizer for a compiler and a computer-readable storage medium storing an optimizing code.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity.

DETAILED DESCRIPTION OF THE PREFERRED EMBODIMENTS

Figure 1:
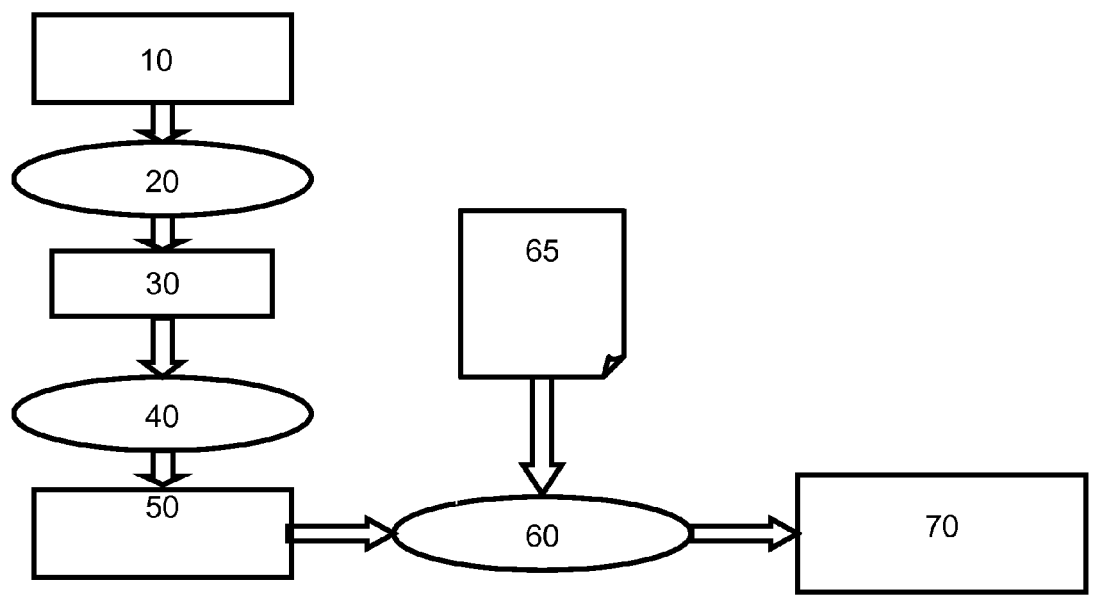
FIG. 1 schematically shows the overall setup of retargetable compiler.

Because the illustrated embodiments of the present invention may for the most part be implemented using computer systems and software known to those skilled in the art, details will not be explained in any greater extent than that considered necessary as illustrated above, for the understanding and appreciation of the underlying concepts of the present invention and in order not to obfuscate or distract from the teachings of the present invention.

In the context of this specification a source code may be the source code representing a complete program, or a part of a program, e.g. a procedure, a function or a basic block. A basic block may be considered to represent a program element with one entry and one exit. A program or part of a program may be represented in source code, machine-readable code or in a so-called intermediate representation. A high-level intermediate representation (HLIR) may be provided by a front-end of a compiler. A HLIR may be close to the original source code. In particular, it may be considered that a HLIR represents an abstract form of code without taking into account a specific instruction set of a target computer system. It may be considered that a HLIR may describe a code representation for any target-platform. For example, a precompiler may provide a high-level intermediate representation. A low-level intermediate representation (LLIR) may be considered to be close to machine-readable code. In particular, a LLIR may be based on respectively derived from a HLIR. A LLIR may take into account a target-platform specific set of instructions. A LLIR may be considered to be target-platform specific. In a LLIR, variables may be assigned to virtual registers. It is feasible to provide a LLIR in static single assignment form (SSA), in which every variable, which may include virtual registers, is assigned respectively defined exactly once. If a variable has more than one assignment respectively definition in the original representation, e.g. the source code, it may be considered to provide different versions for each assignment of a variable in SSA form, e.g. by providing differently numbered versions.

A target-platform may be a computer system with a specific hardware type, in particular a specific type of CPU and/or MMU. It may be considered that a target-platform refers to a combination of specific hardware and a specific operating system. For a compilation or a compilation step, a target-platform may be defined or preset, e.g. by a corresponding command or switch of a compiler call.

It may be contemplated that a virtual register represents one or more variables of a source code in a HLIR and/or a LLIR. A physical register may be a physical register of a specific hardware, in particular a specific target-platform. It may be considered for the purpose of compilation, in particular for cross-compilation, that a physical register of a target-platform is not physically available during compilation, but is taken into account for the purpose of compilation. Thus, it may be possible to compile a source code on a system with n available physical registers for a system having a different number k of physical registers. The physical registers of a target-platform may have characteristics and/or constraints different from a platform the compilation is performed on. The term register may generally refer to a virtual register and/or a physical register. In a given representation of code, a virtual register may be represented by a variable.

It may be considered that there are defined target-platform specific operations or instructions for a register or more than one register. For example, there may be defined instructions to load a value from a certain memory address into a register, or to add together certain register values and to store the result at a certain address or register. The registers or memory addresses referred to in an instruction may be considered to be operands. A destination operand may be considered to be the register or address the result of an operation is written to. A source operand may be a register or address providing a value or address for an operation to work on. An instruction may refer to more than one destination operand and/or more than one source operand. For a given instruction, there may be inter-operand constraints. An inter-operand constraint may limit the type of operands to be used in an instruction to certain registers and/or certain data structures. For example, an instruction ADD may have the constraint that the destination operand is the same as the first source operand. In that case, an ADD instruction would read a first source operand, may add one or more operands and write back the result into the first operand, e.g. a register. A LOAD instruction e.g. may simply read a value stored in a source operand and store it in the destination operand. It is feasible that such a LOAD instructions has no inter-operand constraint, thus any kind of register and/or address may be used as source operand and destination operand. There may be different inter-operand constraints for different instructions and/or registers.

A variable or register, in particular a virtual register, may be considered to be live if it holds a value which may be used later in the program or program part. For live range analysis, a program may be represented by source code or any intermediate representation. A live range may describe a range of instructions during which a register or variable is live. Two variables or registers which are live simultaneously may be considered to interfere. Two or more registers or variables interfering may not use the same register resources. In particular, they it may be considered that interfering registers or variables may not be allocated to the same physical register. Spilling one or more registers to memory may refer to allocating or assigning one or more registers, in particular virtual registers, to memory instead of to a physical register.

An interference graph may comprise nodes representing registers or variables, or groups of registers or variables. Connections respectively edges between nodes may indicate interference between nodes. An interference graph pertaining to groups may be referred to as group interference graph. An interference graph, its nodes and connections may be represented in any suitable way during optimization.

A coloring scheme may refer to a method to allocate virtual registers to physical registers. According to a coloring scheme, there may be allocated a given number of colors to nodes of an interference graph or a group interference graph. If the colors may be allocated to the nodes such that neighboring nodes have different colors, a graph may be considered to be colorable. In particular, a k-coloring scheme may be utilized in which the number of colors may be determined by the total number of registers available for the target-platform. The coloring scheme may be represented in any suitable way during optimization. In particular, an optimizer may use an equivalent instead of actually using colors on nodes to perform a coloring scheme. A colorable graph shows a solution to the register allocation problem in which all nodes with the same color share the same physical register. A coloring scheme may be a multi-coloring scheme using multi-color. A multi-color may refer to a group of virtual registers being allocated more than one color. Each color may be allocated to one or more virtual registers of the group. It may be contemplated that each color of a coloring scheme represents one physical register of the target-platform.

In the following there is generally described an optimization method for a compiler. There may be provided a model of inter-operand constraints of physical registers of a target-platform of a compilation. The model may be based on an ADL (Architecture Design Language) representation of the target-platform respectively the inter-operand constraints of the target-platform. It is feasible to provide an intermediate representation of a source code using virtual registers. The intermediate representation may be a LLIR using virtual registers. The LLIR may have SSA form or any other form providing suitable low-level instructions on virtual registers. Grouping of the virtual registers of the intermediate representation into two or more groups based on the model of inter-operand constraints may be performed. Each group may comprise at least one virtual register. If for at least one group at least one interference of virtual registers within the group occurs, the intermediate representation may be amended to resolve at least one interference. In this case, a new grouping of virtual registers based on the amended intermediate representation may be provided as described above. If no interference within a group occurs, a representation of a group interference graph of interferences between the groups may be provided. A coloring scheme for allocating virtual registers to physical registers based on the representation of the group interference graph may be performed. A representation of a group interference graphs may be provided by combining the interference information on the live ranges in each group. The nodes of a group interference graph may be the groups.

It may be considered to detect live ranges of the virtual registers of the intermediate representation before grouping is performed. It is feasible to check for interference based on detected live ranges. Spilling to memory a part of one group or one group if at least one interference between two or more groups occurs after providing a representation of a group interference graph may be performed. It may be checked whether interference within a group and/or interference between groups occurs.

Target-platform strategy information may be provided. Target-platform strategy information may include information regarding register manipulation instructions of the target platform. It is feasible that target-platform strategy information may include information on how to copy or move values between registers. For example, target-platform strategy information may include a MOVE instruction as used by the target-platform. Amending the intermediate representation may be performed based on target-platform strategy information, e.g. by using information determining a MOVE instruction to include a corresponding command into the intermediate representation to define a new virtual register to change the live range of a given virtual register. It is feasible to perform spilling to memory based on target-platform strategy information. Target-specific strategies may provide information regarding the coloring order to be used. The coloring order may be based on the number of components, respectively, registers in a group and/or on the number of inter-group dependencies. The coloring order may be based on target-specific aspects of the physical registers. Such specifics may e.g. determine which type of value may be held in register, e.g. an integer, real or double precision variable. The target-platform strategy information may provide information regarding a spilling strategy, i.e. which group or groups should be spilled and if they should be spilled partially or totally. The spill target, i.e. the memory range or memory address of a group to be spilled partially or totally, may be determined by target-platform strategy information.

The model of inter-operand constraints of physical registers may comprise an enumeration of combinations of physical registers allowed by the inter-operand constraints of the target-platform.

Now referring to FIG. 1, there is schematically shown a compiler scheme for a compiler with an optimizer for register allocation. The compiler may be a retargetable compiler.

Reference numeral 10 refers to a HLIR of a source code which may be provided by a front-end of a compiler, e.g. a pre-compiler. A code generator 20 may translate the high level intermediate representation into a low level intermediate representation closer to machine code. The resulting LLIR 30 may assign virtual registers to variables. Based on the low level intermediate representation 30, a SSA form generator 40 may provide a LLIR 50 with virtual register in SSA form. The code generator 20 providing LLIR 30 and/or SSA form generator 40 proving the LLIR in SSA form may be considered to be an intermediate representation component adapted to provide and/or receive an intermediate representation of the source code using virtual registers. A register allocator 60 may provide an allocated LLIR 70 with allocated physical registers based on LLIR 50 in SSA form. Register allocator 60 may interact with or utilize a model of inter-operand constraints 65, to take into account inter-operands constraints of the target-platform, which may be considered to be a model component. The register allocator or optimizer 60 may be considered to be an allocating component adapted to allocate virtual registers to physical registers using a coloring scheme on the representation of the group interference graph. The coloring scheme may be a multi-coloring scheme using multi-color. A multi-color may refer to a group being allocated more than one color. Each color may be allocated to one or more virtual registers of the group. It may be contemplated that each color represents one physical register of the target-platform. The register allocator 60 may perform the allocation of virtual register to physical registers taking into account on target-platform strategy information.

Figure 2:
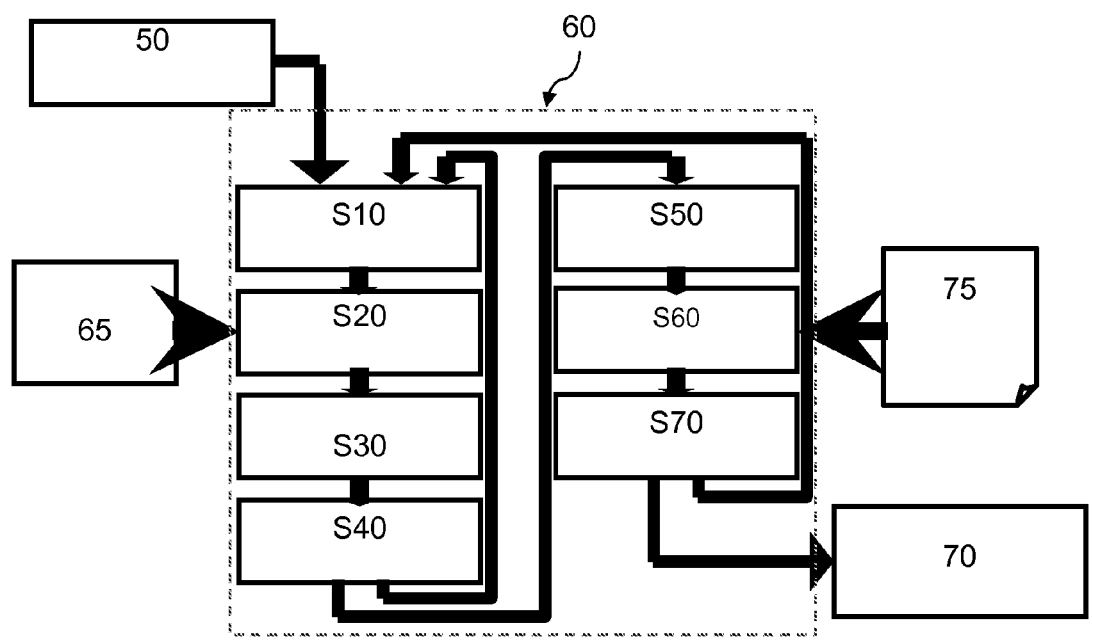
FIG. 2 shows a compiler scheme for register allocation in more detail.

FIG. 2 shows a translation from the LLIR with virtual registers in SSA form 50 to the allocated LLIR with allocated physical registers 70 in more detail. In particular, based upon the LLIR with virtual registers in SSA form 50, live ranges of variables or virtual registers to be allocated may be detected (S10) by a live range detection component. Live ranges may be detected for a basic block of the program respectively source code to be translated, or may be detected globally and/or for one function or procedure. Based on the live ranges, groups and classes of groups of virtual registers may be constructed or defined in S20. For the definition of groups and classes of groups (S20), a model of inter-operand constraints 65 of the target-platform may be utilized.

Based on the groups and/or group-classes, interferences between live ranges may be detected. In particular, interferences within a group, so-called intra-group interferences, may be detected by an associated component adapted accordingly (S30). In the case that at least one intra-group interference in at least one of the groups is detected, the intermediate representation, in this case LLIR 50, may be amended to resolve the interference by a representation amending component (S40). An interference within a group may e.g. be fixed by spilling a virtual register and/or splitting the group and/or adding fix-up code and/or providing a new instance for a virtual register. For any fix of intra-group interferences it may be considered to branch back to detecting live ranges (S10) based on the amended intermediate representation. This step may be performed repeatedly on differing intermediate representations in one or more iterations of the optimization method. The representation amending component may be adapted to detect interference between live ranges respectively virtual registers.

If no intra-group interference occurred, it may be branched into building a representation of a group interference graph of interferences between the groups (S50). This may be performed by a group interference graph component. After providing the groups interference graph, allocation of virtual registers to physical registers may be performed based on the group interference graph (S60) by an allocating component. A k-coloring method may be used on the group interference graph. If it is not possible to successfully color the group interference graph, one or more live ranges, a group, part of a group or corresponding virtual registers may be spilled respectively assigned to memory. This step may be performed repeatedly on differing groups in one or more iterations of the optimization method. For coloring the group interference graph, there may be provided a target-platform information component 75 comprising target-platform specific strategy information, which may be adapted to accommodate idiosyncrasies of specific architectures respectively platforms.

If live ranges, a virtual register or group or part thereof had to be spilled to memory, it may be branched back to the step of detecting live ranges to allocate (S10) and the intermediate steps are performed again. If the coloring was successful such that no spill to memory was necessary, there may be provided an allocated LLIR 70, in which virtual registers may be allocated to physical registers of the target architecture or target-platform.

An optimizer or register allocator 60 for a compiler may comprise one or more of these components in any combination. The optimizer may be adapted to perform the optimizing method.

A component may be provided as a program, module, plug-in or as a routine of a program. It is feasible that units are provided comprising one or more components. The components respectively the optimizer may be included in a compiler program. The inter-operand model comprising information regarding register constraints of a given target platform and/or the target-platform information component may be provided in the form of a plug-in. Thus, the method may easily be adapted to different target platforms without having to amend the overall allocation or optimizing method or the corresponding code.

The model component may comprise templates for instructions of a target platform, respectively, a target definition model. There may be provided models for more than one target-platform. It is feasible that a suitable model is used for a given target-platform. An instruction template in a target definition model may have associated to it constraints between its operands. In an inter-operand constraints model, constraints may be described as an enumeration of register combinations allowable for a given instruction or operation. A model may comprise all allowable combinations of registers for all instructions of a target-platform or a subset of combinations respectively instructions. It may be envisioned that no specific constraints are defined for individual combinations of the enumeration.

Colors may be sorted according to group classes, respectively, constraint levels of registers. If during the coloring scheme, a node cannot receive one of the colors, it may be considered to partially or totally spill one of the groups. The group unable to receive the color or an interfering group may be spilled. Partially spilling a group may comprise spilling one or more virtual registers. Which group to spill partially or totally may be determined based on target-platform strategy information. In the case that during the coloring phase of the group interference graph no spilling has to be performed, the graph may be considered to be fully colorable. In this case, no variables have to be assigned to memory, as enough registers are present to hold the variables respectively virtual registers. Should spilling be performed, the method may return of the step of detecting live ranges (S10), taking into consideration the registers, respectively, groups spilled.

The target specific strategies may define different allocation strategies or constraints, depending on a targeted architecture, respectively, platform. The model and/or the target-specific strategy information respectively the corresponding components may be seen as being configurable according to a target-platform. The other components for register allocation may be seen as target-independent. This may provide a clear separation between the background algorithm responsible for optimizing register allocation and target-platform dependent information.

Figure 3:
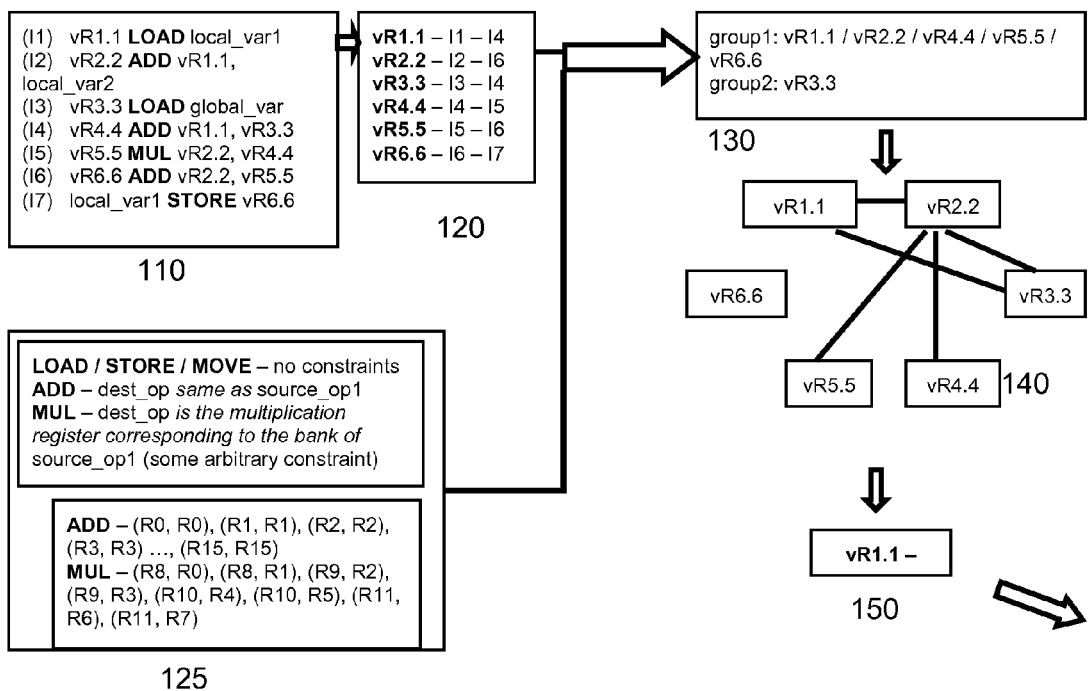
FIG. 3 shows an example of technique for register allocation beginning with the allocation of live ranges.

FIG. 3 schematically shows an example of register allocation. In block 110, an example of a LLIR is shown with virtual registers in SSA form. Block 110 may provide a representation of the instructions related to virtual registers used during a procedure or a basic block. The instructions may be listed in an arrangement of numbered instructions I1 to I7. Virtual registers vR1.1, vR2.2, vR3.3, vR4.4, vR5.5 and vR6.6 may be provided. Each numbered instruction may refer to at least one virtual register used as an operand. In particular, a virtual register may be used as source operand and/or destination operand. Each virtual register may represent a variable defined and used in the source code. An instruction which may work on one or more operands is assigned to each virtual register to provide a result which may be written into the corresponding virtual register. Thus, e.g. the instruction vR1.1 LOAD local_var1 may represent an instruction to load the value of a local variable local_var1 into virtual register vR1.1. Local variables local_var1 and local_var2 may represent variables that may be defined locally, e.g. only for a procedure or in a basic block. Global variable global_var may represent a global variable, e.g. it may be defined for a whole procedure or function or for the whole program. Based on the LLIR with virtual registers in SSA form of block 110, a live range detection may be performed, which may result in a live range allocation respectively live range description as shown in block 120. Block 120 shows the ranges of numbered instructions in which the virtual variables vR1.1 to vR6.6 are live in respect to the intermediate code shown in block 110. For example vR1.1 may be live from I1 to I4, whereas vR3.3 may be live from I3 to I4.

Block 125 below block 120 may define inter-operand constraints pertaining to physical registers of the target-platform. Physical registers are indicated by R0, R1 ... R15. At the top of block 125, examples of constraints are shown. For example, operations LOAD, STORE, MOVE may be defined without constraints, e.g. any kind of value may be loaded into a register. Operator ADD may show a constraint that the destination operand dest_op is of the same type as the first source operand source_op1. For example, in I2 of block 110, the first source operand may be vR1.1 and the destination operand may be vR2.2. For this instruction, vR1.1 and vR2.2 would have to be the same register. For operation MUL some arbitrary constraints may be present, for example, that the destination operator dest_op, e.g. vR5.5 in I5, is the multiplication register corresponding to the bank of the first source operand, e.g. vR2.2 in I5. These and other register constraints may depend on the target-platform. An enumeration of acceptable combinations of registers may be provided for each operation or instruction of the intermediate representation. These may be represented by n-tupels, wherein n is the number of physical registers used as operands for a given instruction. E.g., for operators ADD and MUL there are used tupels having two physical registers. In this example, for ADD the destination and first source operand have to be equal, whereas no constraint applies to the second source operand. Thus, allowed combinations for ADD may comprise all tupels in which both components are the same, e.g. (R0, R0), (R1, R1), etc. The tupels shown in block 125 may be considered to be an incomplete example of allowed register combinations.

Based on the live ranges to allocate as shown in block 120 and the model of constraints of block 125, there may be defined groups respectively group classes of virtual registers as shown in block 130. A first group named GROUP1 comprising the virtual registers vR1.1, vR2.2, vR4.4, vR5.5, vR6.6 may be defined. This group may comprise all virtual registers connected to vR1.1 via a constraint as given by the enumeration of allowed register combinations of the model of inter-operand constraints. It may be seen from block 110 that vR1.1 may be connected to vR2.2 in I2 and be constrained via the ADD instruction. There may also be provided a constraint relation to vR4.4 in I4. To further define group1, the constraints of vR2.2 and vR4.4 may be considered, which may also have a constraining effect on vR1.1. It may be considered to define a group to contain all virtual registers in an instruction list of interest which are related to each other via constraints. The exact form of constraint may not be considered to be necessary, as the enumeration of allowable register combinations provides sufficient information to group the virtual registers. A second group GROUP2 may comprise a virtual register vR3.3. As can be seen from block 110, vR3.3 may be independent from the other virtual registers, without being in a constraint relation with another register as defined by the enumeration of the constraint model.

In block 140, a live range interference graph is shown. In the live range interference graph, each node may represent an individual virtual register. All registers for vR1.1 to vR6.6 may be seen in the interference graph, thus both groups are drawn. The lines between the nodes may represent interferences, i.e. they may indicate registers live at the same time. Instead of one graph including both groups, there may be provided one live register interference graph per group.

Based upon the live ranges interference graph, intra-group interference may be determined, which may pertain to interferences inside one group. One example of such interference is an interference between vR1.1 and vR2.2 of group GROUP1, as shown in block 150. It may be seen from block 120 that there may indeed be an interference, as vR1.1 is live from I1 to I4, and vR2.2 is live from I2 to I6, thus an overlap of life ranges occurs.

Figure 4:
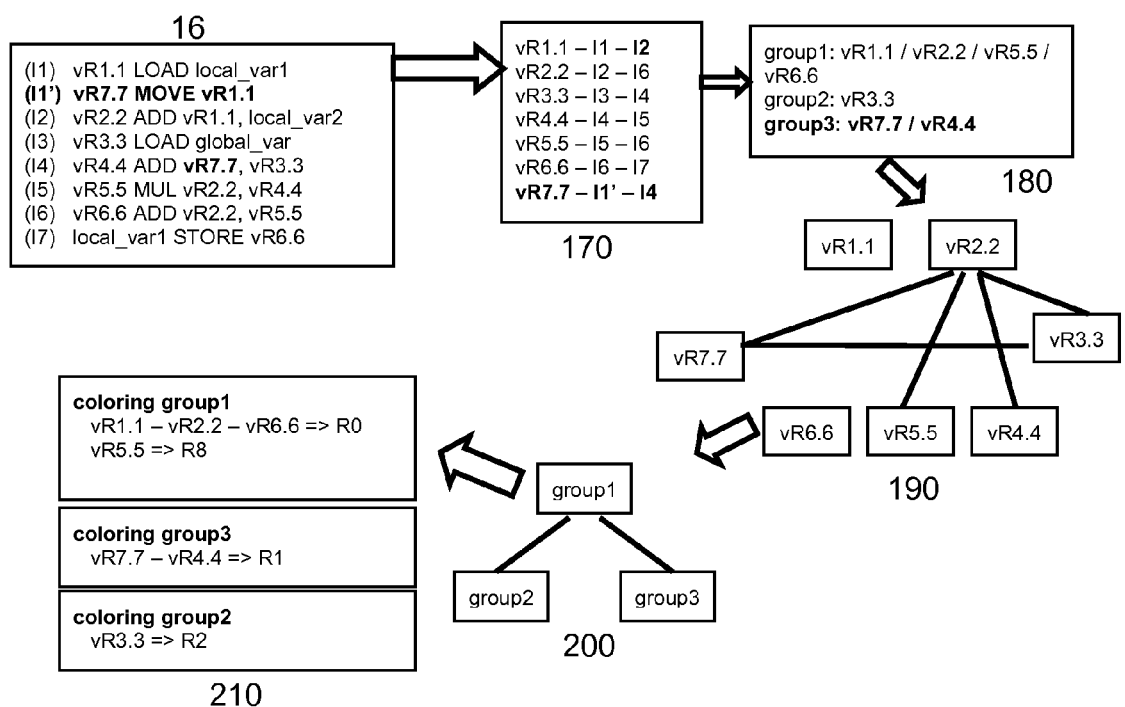
FIG. 4 shows the continuation of the register allocation started in FIG. 3.

FIG. 4 shows the continuation of the diagram in FIG. 3. To resolve the interference detected in block 150, a fix-up code may be inserted into the intermediate representation. The code insertion may be performed by a representation amending component. In particular, a new virtual variable vR7.7 may be defined. In a new numbered instruction I1', the value of vR1.1 may be moved into vR7.7. Based on this amended intermediate representation in SSA form, a new live range detection may be performed. By inserting the new virtual register vR7.7, the live range of vR1.1 may change to reach from I1 to I2 instead of from I1 to I4 as shown in block 110. This change may be seen in block 170, which shows the new live range allocation. Based on the new live range allocation, a new grouping of virtual registers may be performed. The constraints model of block 125 may be taken into account when defining new groups. It should be noted that a new instruction MOVE introduced in step I1' does not have any constraints. Similar to the approach of grouping described with regard to block 130, there may be defined group1 comprising vR1.1, vR2.2, vR5.5, vR6.6, group2 comprising vR3.3 and group3 comprising vR7.7 and vR4.4 as shown in block 180. Based on the allocated groups, a live range interference graph 190 may be produced for each group.

If no interferences inside a group need to be fixed, a group interference graph may be built based on the groups. The group interference graph may show interferences between groups, as indicated in block 200.

Coloring may be performed on this group interference graph using a multi-color approach for the groups. The result of the coloring is shown in block 210. A successful coloring leads to an allocation of real registers to virtual registers without virtual registers being unassigned by the coloring. In the example shown in FIGS. 3 and 4, the grouping and coloring leads to virtual registers vR1.1, vR2.2 and vR6.6 being allocated to register R0. The register vR5.5 is allocated to register R8. It should be noted that this is in line with the constraints as defined in the target-platform constraints model of block 125. For example, it may be seen that vR5.5 is associated to a MUL operation for which certain constraints exist. Accordingly, a combination of R8 for the destination operand and the R0 for the first source operand may be accepted, as (R8, R0) is an allowed combination. From group3, variables vR7.7 and vR4.4 are allocated to register R1. From group2, virtual register vR3.3 may be allocated to R2. Thus, the registers have been allocated, in this case without spilling a virtual register, a group or a part thereof.

The method may be used to optimize a compiler and provides a basic algorithm which is target-independent. Via the inter-operand constraints model and/or target-specific strategies, the register allocation method may be adapted to target platform specific characteristics. The method and the corresponding optimizer are easily retargetable and provide improved target-platform specific optimization.

There may be envisioned a computer-readable storage medium storing code respectively instructions representing the optimizer and/or code to perform the optimizing method.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the optimizer may be integrated in a compiler or may be a separate module.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An optimization method for a compiler, comprising: providing a model of inter-operand constraints of physical registers of a target-platform of a compilation; and
   a) providing an intermediate representation of a source code using virtual registers;
   b) grouping the virtual registers of the intermediate representation based on the model of inter-operand constraints into two or more groups, each group comprising at least one virtual register;
   c) if for at least one group at least one interference of virtual registers within the group occurs, amending the intermediate representation to resolve the at least one interference and jumping to step b); otherwise
   d) providing a representation of a group interference graph of interferences between the groups; and
   e) allocating virtual registers to physical registers using a coloring scheme on the representation of the group interference graph.

2. The optimization method of claim 1, wherein b) further comprises detecting live ranges of the virtual registers of the intermediate representation before the grouping is performed.

3. The optimization method of claim 1, wherein d) further comprises spilling to memory a part of one group or one group if at least one interference between two or more groups occurs after providing the representation of the group interference graph.

4. The optimization method according to claim 1, comprising providing target-platform strategy information.

5. The optimization method according to one of claim 4, wherein the target-platform strategy information includes information regarding register manipulation instructions of the target-platform.

6. The optimization method according to claim 4, wherein amending the intermediate representation is performed based on the target-platform strategy information.

7. The optimization method according to claim 3, wherein spilling to memory is performed based on target-platform strategy information.

8. The optimization method according to claim 1, wherein the model of inter-operand constraints of physical registers comprises an enumeration of combinations of physical registers allowed by the inter-operand constraints of the target-platform.

9. A tangible computer storage medium comprising an optimizer for a compiler, the optimizer comprising:
   a model component adapted to provide a model of a inter-operand constraints of physical registers of a target-platform of a compilation;
   an intermediate representation component adapted to provide and/or receive an intermediate representation of source code using virtual registers;
   a grouping component adapted to group the virtual registers of the intermediate representation into two or more groups based on the model of inter-operand constraints, wherein each group comprises at least one virtual register;
   a representation amending component adapted to amend the intermediate representation if for at least one group at least one interference of virtual registers within the group occurs to resolve the at least one interference;
   a group interference graph component adapted to provide a representation of a group interference graph of interferences between the groups; and
   an allocating component adapted to allocate virtual registers to physical registers using a coloring scheme on the representation of the group interference graph.

10. The optimizer according to claim 9, further comprising a live range detection component adapted to detect live ranges of the virtual registers of the intermediate representation.

11. The optimizer according to claim 9, further comprising a spilling component adapted to spill a group or part of a group to memory.

12. The optimizer according to claim 9, further comprising a target-platform information component adapted to provide target-platform strategy information.

13. The optimizer according to claim 9, wherein the representation amending component is adapted to amend the intermediate representation based on the target-platform strategy information and/or the spilling component is adapted to spill a group or part of a group to memory based on the target-platform strategy information.

14. The optimization method of claim 2, wherein d) further comprises spilling to memory a part of one group or one group if at least one interference between two or more groups occurs after providing the representation of the group interference graph.

15. The optimization method according to claim 2, comprising providing target-platform strategy information.

16. The optimization method according to claim 3, comprising providing target-platform strategy information.

17. The optimization method according to claim 2, wherein the model of inter-operand constraints of physical registers comprises an enumeration of combinations of physical registers allowed by the inter-operand constraints of the target-platform.

18. The optimization method according to claim 3, wherein the model of inter-operand constraints of physical registers comprises an enumeration of combinations of physical registers allowed by the inter-operand constraints of the target-platform.

19. The optimizer according to claim 10, further comprising a spilling component adapted to spill a group or part of a group to memory.

20. The optimizer according to claim 10, further comprising a target-platform information component adapted to provide target-platform strategy information.

* * * * *